US012140099B2

(12) United States Patent
Wakamoto

(10) Patent No.: US 12,140,099 B2
(45) Date of Patent: Nov. 12, 2024

(54) ENGINE

(71) Applicant: SUBARU CORPORATION, Tokyo (JP)

(72) Inventor: Shinji Wakamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/370,232

(22) Filed: Sep. 19, 2023

(65) Prior Publication Data

US 2024/0110530 A1 Apr. 4, 2024

(30) Foreign Application Priority Data

Sep. 29, 2022 (JP) ................................ 2022-156841

(51) Int. Cl.
*F02D 41/06* (2006.01)
*F02B 19/12* (2006.01)
(Continued)

(52) U.S. Cl.
CPC ............ *F02D 41/068* (2013.01); *F02B 19/12* (2013.01); *F02B 19/18* (2013.01); *F02D 41/401* (2013.01);
(Continued)

(58) Field of Classification Search
CPC ........ F02B 19/08; F02B 19/102; F02B 19/12; F02B 19/18; F02M 23/10; F02D 41/06; F02D 41/068; F02D 41/40; F02D 41/401; F02P 5/00; F02P 5/045; F02P 5/15; F02P 5/1504; F02P 13/00; F02P 23/04;
(Continued)

(56) References Cited

U.S. PATENT DOCUMENTS

2010/0282219 A1* 11/2010 Alonso ................. F02B 75/282 123/51 AA
2014/0060466 A1* 3/2014 Taylor ..................... F02B 33/04 123/68

(Continued)

FOREIGN PATENT DOCUMENTS

JP 3956503 B2 5/2007
JP 2011-38465 A 2/2011
JP 6562019 B2 8/2019

*Primary Examiner* — Carl C Staubach
*Assistant Examiner* — Johnny H Hoang
(74) *Attorney, Agent, or Firm* — TROUTMAN PEPPER HAMILTON SANDERS LLP

(57) ABSTRACT

An engine is configured to ignite an air-fuel mixture with an electric spark to ignite an air-fuel mixture. The engine includes: a cylinder head including a chamber partition wall having through holes and defining a main combustion chamber and a sub-combustion chamber; a fuel injector that injects fuel into the main combustion chamber; an air injector that injects air into the sub-combustion chamber; an ignition device causes an electric discharge between an ignition electrode and the chamber partition wall; and a control system that controls the fuel and air injectors, and the ignition device. At a compression stroke during a warm-up operation, the fuel is injected throughout a first period, and the air is injected throughout a second period at least partially overlapping the first period. At a power stroke during the warm-up operation, the electric discharge is caused after the fuel is injected.

8 Claims, 14 Drawing Sheets

(51) Int. Cl.

| | |
|---|---|
| ***F02B 19/18*** | (2006.01) |
| ***F02D 41/40*** | (2006.01) |
| ***F02M 23/10*** | (2006.01) |
| ***F02P 5/15*** | (2006.01) |
| *F02D 41/38* | (2006.01) |

(52) U.S. Cl.
CPC ........... *F02M 23/10* (2013.01); *F02P 5/1504* (2013.01); *F02D 2041/389* (2013.01)

(58) Field of Classification Search
CPC .......... F02P 9/007; F02P 15/006; F02P 15/08; Y02T 10/12; H05H 1/2406; H05H 1/2418
See application file for complete search history.

(56) References Cited

U.S. PATENT DOCUMENTS

| | | | | |
|---|---|---|---|---|
| 2018/0135506 | A1* | 5/2018 | Grover, Jr. | F02P 23/04 |
| 2018/0266307 | A1 | 9/2018 | Muto | |
| 2020/0182217 | A1* | 6/2020 | Keum | H05H 1/2406 |
| 2022/0268221 | A1* | 8/2022 | Yu | F02B 19/18 |

* cited by examiner

ENGINE

CROSS-REFERENCE TO RELATED APPLICATION

The present application claims priority from Japanese Patent Application No. 2022-156841 filed on Sep. 29, 2022, the entire contents of which are hereby incorporated by reference.

BACKGROUND

The present disclosure relates to an engine in which an air-fuel mixture is ignited using an electric spark.

In the field of engines and internal combustion engines, a technique is known for injecting flames from a sub-combustion chamber to a main combustion chamber of a cylinder head (see Japanese Patent No. 3956503, Japanese Unexamined Patent Application Publication (JP-A) No. 2011-38465, and Japanese Patent No. 6562019). Injecting flames from the sub-combustion chamber to the main combustion chamber allows a lean air-fuel mixture in the main combustion chamber to be appropriately combusted.

SUMMARY

An aspect of the disclosure provides an engine configured to ignite an air-fuel mixture with an electric spark. The engine includes a cylinder head, a fuel injector, an air injector, an ignition device, and a control system. The cylinder head includes a chamber partition wall provided with through holes. The chamber partition wall defines a main combustion chamber and a sub-combustion chamber. The fuel injector is provided in the cylinder head. The fuel injector is configured to inject fuel into the main combustion chamber. The air injector is provided in the cylinder head. The air injector is configured to inject air into the sub-combustion chamber. The ignition device includes an ignition electrode disposed in the sub-combustion chamber. The ignition device is configured to cause an electric discharge between the ignition electrode and the chamber partition wall. The control system includes a processor and a memory communicatively connected to each other. The control system is configured to control the fuel injector, the air injector, and the ignition device. The control system is configured to, at a compression stroke during a warm-up operation, cause the fuel to be injected from the fuel injector throughout a first period, and cause air to be injected from the air injector throughout a second period that overlaps at least a part of the first period. The control system is configured to, at a power stroke during the warm-up operation, causes the electric discharge between the ignition electrode and the chamber partition wall after causing the fuel to be injected from the fuel injector.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

After an engine is started, a warm-up operation is performed. In this warm-up operation, ignition retard control of retarding the ignition timing is performed to warm a catalytic converter of an exhaust system at an early stage. In addition, to reduce nitrogen oxides NOx in the exhaust gas, stratified charge combustion control is performed to inject a large amount of fuel during the compression stroke. Further, since the temperatures in the main combustion chamber and the sub-combustion chamber are low during the warm-up operation, it is difficult to appropriately combust the air-fuel mixture during the warm-up operation while also performing the ignition retard control to lower the combustion stability of the air-fuel mixture. That is, in a case where the temperature of a partition wall defining the sub-combustion chamber is low, the fuel injected into the main combustion chamber during the compression stroke for stratified charge combustion may adhere to the partition wall, locally increasing fuel density. This may cause an increase in hydrocarbons HC and the like in the exhaust gas. Accordingly, there is demand for a technique for appropriately executing an engine warm-up operation by achieving good combustion of an air-fuel mixture even during the warm-up operation.

It is desirable to appropriately execute an engine warm-up operation.

Figure 1:
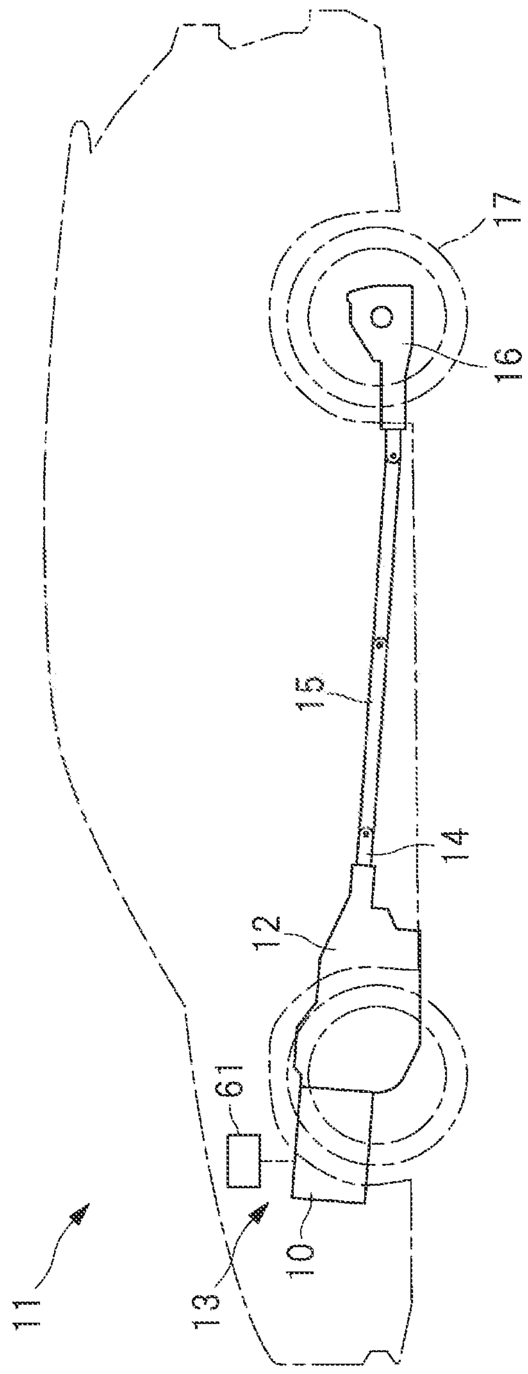
FIG. 1 is a diagram illustrating an example of a vehicle installed with an engine, which is an embodiment of the present disclosure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and conf Vehicle FIG. 1 is a diagram illustrating an example of a vehicle 11 installed with an engine 10 according to the embodiment of the present disclosure. As illustrated in FIG. 1, a power unit 13 including the engine 10 and a transmission 12 is installed in the vehicle 11. A rear wheel 17 is coupled to an output shaft 14 of the power unit 13 via a propeller shaft 15 and a differential mechanism 16. As will be described later, the illustrated engine 10 is a horizontally-opposed engine but no such limitation is intended. The engine 10 may be an inline engine, a V engine, or a single-cylinder engine. Additionally, although the illustrated power unit 13 is a power unit for rear-wheel drive, no such limitation is intended. The power unit 13 may be for front-wheel drive or for all-wheel drive.

Engine

Figure 2:
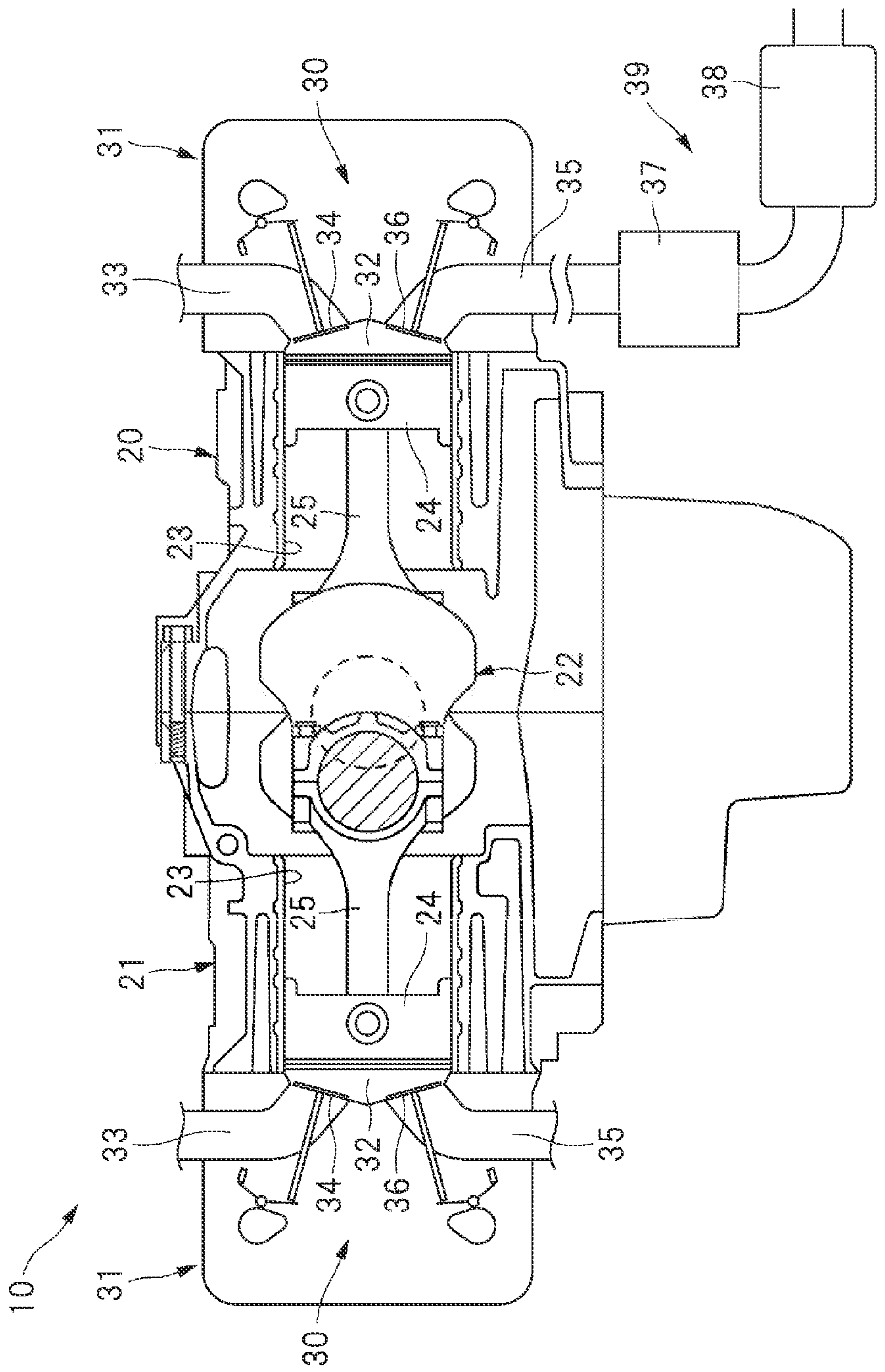
FIG. 2 is a diagram illustrating an example of the engine.

FIG. 2 is a diagram illustrating an example of the engine 10. As illustrated in FIG. 2, the engine 10 includes a cylinder block 20 forming one cylinder bank, a cylinder block 21 forming another cylinder bank, and a crankshaft 22 supported by the pair of cylinder blocks 20 and 21. A cylinder bore 23 is formed in each cylinder block 20, 21, and a piston 24 is housed in each cylinder bore 23. The crankshaft 22 and the piston 24 are coupled via a connecting rod 25.

A cylinder head 31 including a valve train 30 is attached to each cylinder block 20, 21. An intake port 33 that opens to a main combustion chamber 32 is formed in the cylinder head 31, and an intake valve 34 that opens and closes the intake port 33 is installed in the cylinder head 31.

Also, an exhaust port 35 that opens to the main combustion chamber 32 is formed in the cylinder head 31, and an exhaust valve 36 that opens and closes the exhaust port 35 is installed in the cylinder head 31. Further, an exhaust system 39 including a catalytic converter 37 and a muffler 38 is connected to the cylinder head 31 to guide the exhaust gas from the exhaust port 35 to the outside.

Figure 3:
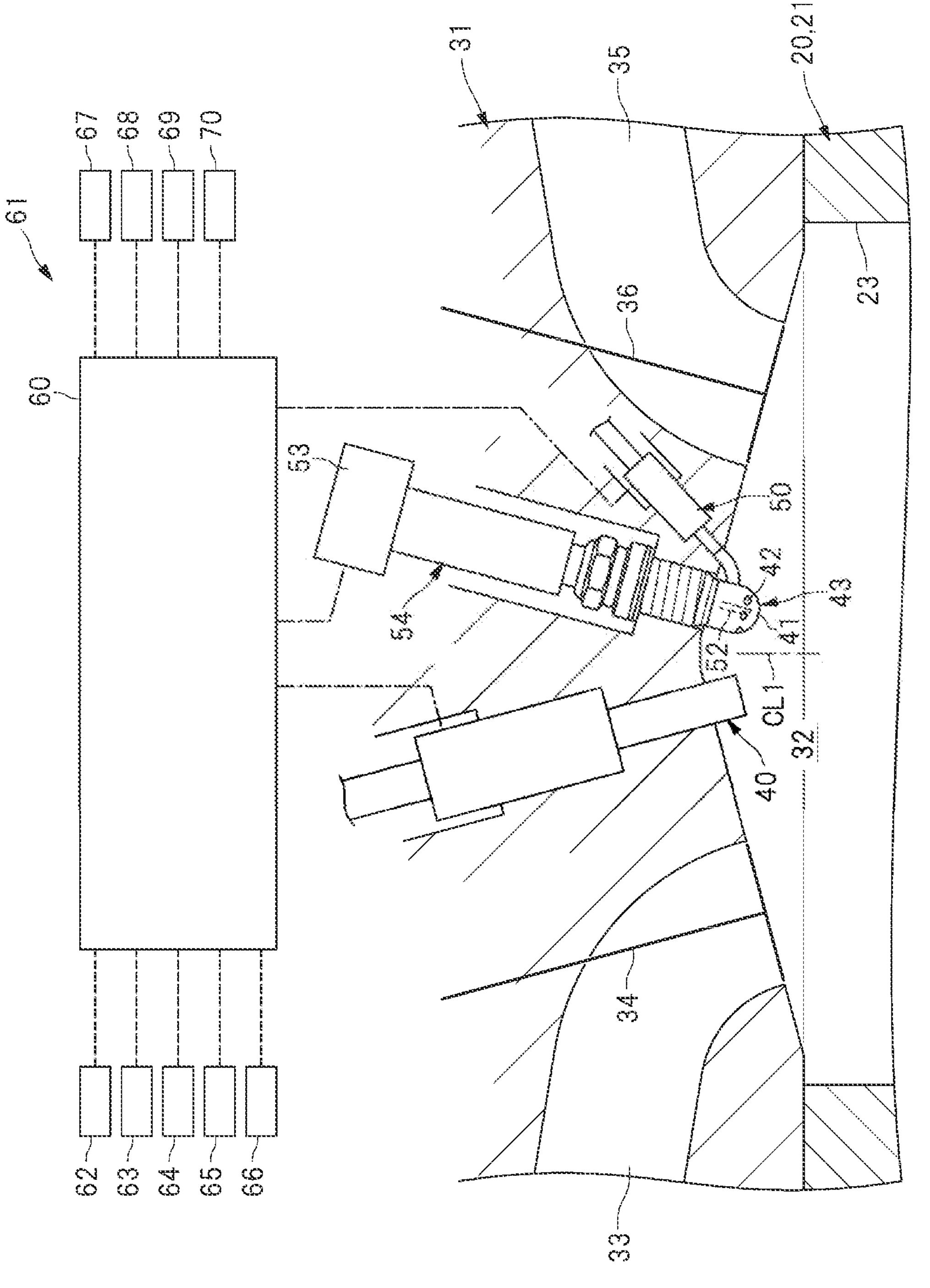
FIG. 3 is a diagram illustrating a main combustion chamber formed in a cylinder head and the area around the main combustion chamber.

FIG. 3 is a diagram illustrating the main combustion chamber 32 formed in the cylinder head 31 and the area around the main combustion chamber 32. As illustrated in FIG. 3, the main combustion chamber 32 that communicates with the intake port 33 and the exhaust port 35 is formed in the cylinder head 31. Herein, the space defined by the cylinder head 31, the cylinder bore 23, and the piston 24 will be referred to as the main combustion chamber 32. The cylinder head 31 is provided with a fuel injector 40 for injecting fuel into the main combustion chamber 32, and a pre-chamber partition wall (chamber partition wall) 43 in which through holes 41 and 42 are formed. The fuel injector 40 and the pre-chamber partition wall 43 are disposed closer to a center CL1 of the main combustion chamber 32 than the intake valve 34 and the exhaust valve 36. Other components such as a high-pressure fuel pump (not illustrated) are connected to the fuel injector 40.

Figure 4:
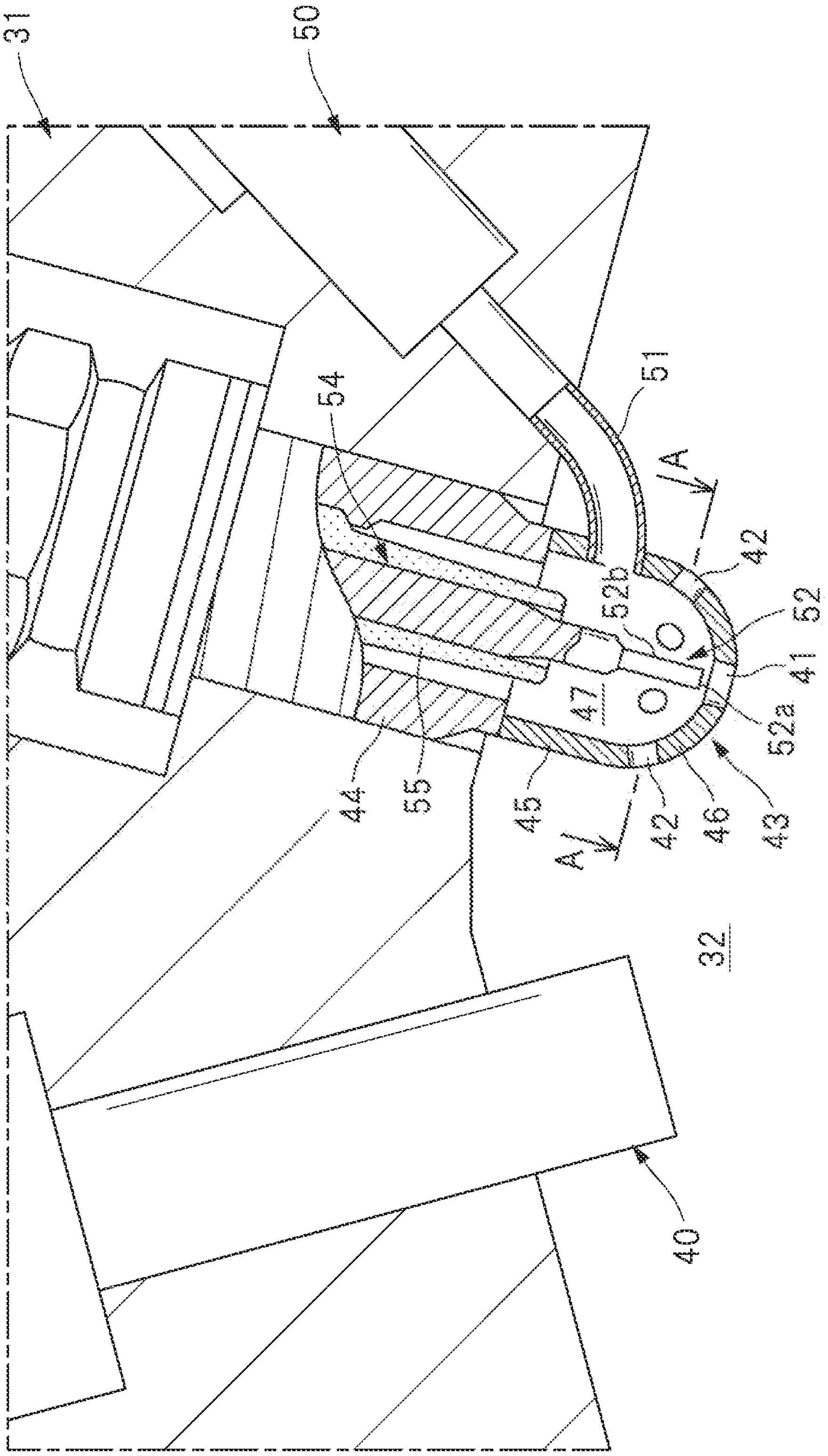
FIG. 4 is a diagram illustrating a pre-chamber partition wall and the area around the pre-chamber partition wall.

FIG. 4 is a diagram illustrating the pre-chamber partition wall 43 and the area around the pre-chamber partition wall 43. As illustrated in FIG. 4, the pre-chamber partition wall 43 includes a base 44 attached to the cylinder head 31, a cylindrical side wall 45 provided on the base 44, and a hemispherical dome portion 46 provided on the side wall 45. When the pre-chamber partition wall 43 is provided in the cylinder head 31, the main combustion chamber 32 and a sub-combustion chamber 47 are defined by the pre-chamber partition wall 43 at the cylinder head 31. That is, at the cylinder head 31, the main combustion chamber 32 is provided on the outer side of the pre-chamber partition wall 43, and the sub-combustion chamber 47 is provided on the inner side of the pre-chamber partition wall 43. The pre-chamber partition wall 43 is formed using a conductive material such as a metal.

The cylinder head 31 is provided with an air injector 50 for injecting air into the sub-combustion chamber 47 inside the pre-chamber partition wall 43. The air injector 50 and the pre-chamber partition wall 43 are connected to one another via a connection pipe 51. Other components such as a high-pressure air pump (not illustrated) are connected to the air injector 50. Also, as illustrated in FIGS. 3 and 4, the cylinder head 31 is provided with an ignition device 54 including an ignition electrode 52 disposed inside the sub-combustion chamber 47 and a feeder circuit 53 including, for example, an ignition coil and an igniter. The ignition electrode 52 is located approximately at the center of the pre-chamber partition wall 43, and an insulator 55 is provided between the base 44 of the pre-chamber partition wall 43 and the ignition electrode 52. A distal end 52*a* of the ignition electrode 52 extends to or near to a central through hole 41 of the dome portion 46 described below. In the ignition device 54, applying a high voltage to the ignition electrode 52 from the feeder circuit 53 causes an electric discharge between the ignition electrode 52 and the pre-chamber partition wall 43. This electric discharge can generate an electric spark between the ignition electrode 52 and the pre-chamber partition wall 43.

Figure 5:
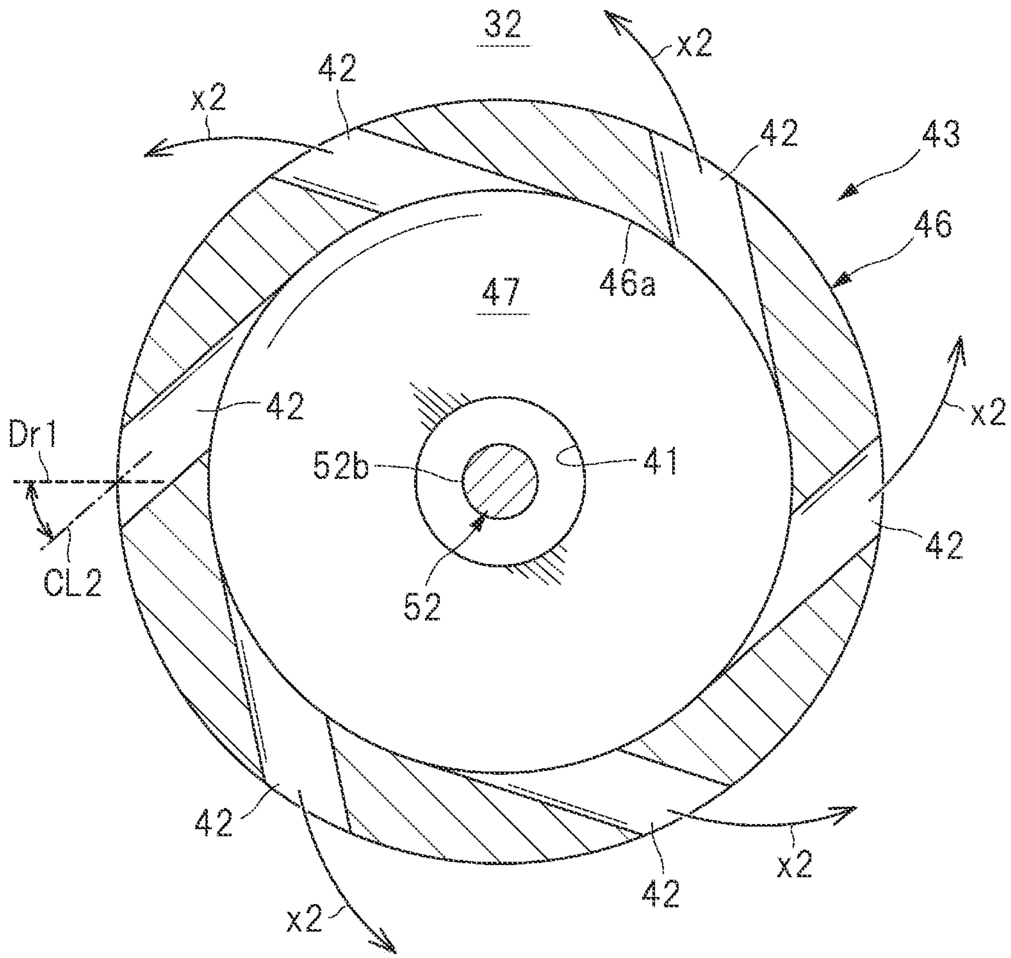
FIG. 5 is a cross-sectional view of the pre-chamber partition wall taken along line A-A in FIG. 4.

The through holes 41 and 42 through which flames are injected are formed in the dome portion 46 of the pre-chamber partition wall 43. That is, as the through holes 41 and 42, a central through hole (first through hole) 41 formed at the center of the dome portion 46 opposing the distal end 52*a* of the ignition electrode 52 and side through holes (second through holes) 42 disposed around the central through hole 41 opposing a side surface 52*b* of the ignition electrode 52 are formed in the pre-chamber partition wall 43. FIG. 5 is a cross-sectional view of the pre-chamber partition wall 43 taken along line A-A in FIG. 4. As illustrated in FIG. 5, the side through holes 42 formed in the pre-chamber partition wall 43 are arranged at predetermined intervals in the circumferential direction, and are open in a tangent direction of an inner peripheral surface 46*a* of the dome portion 46. That is, a center line CL2 of each side through hole 42 formed in the pre-chamber partition wall 43 is inclined with respect to a radial direction Dr1 of the ignition electrode 52. In the illustrated example, since the ignition electrode 52 is disposed at the center of the pre-chamber partition wall 43, the radial direction Dr1 of the ignition electrode 52 and the radial direction of the cylindrical side wall 45 are aligned.

As illustrated in FIG. 3, the engine 10 is provided with a control system 61 including an electronic control unit 60 for controlling the fuel injector 40, the air injector 50, the ignition device 54, and the like. Sensors connected to the electronic control unit 60 include a vehicle velocity sensor 62 for detecting vehicle velocity, an acceleration sensor 63 for detecting an operation amount of an accelerator pedal, and a brake sensor 64 for detecting an operation amount of a brake pedal. Sensors connected to the electronic control unit 60 also include a crank rotation sensor 65 for detecting the rotation angle of the crankshaft 22, a coolant temperature sensor 66 for detecting the coolant temperature of the engine 10, and an air flow sensor 67 for detecting the air intake amount of the engine 10. Sensors connected to the electronic control unit 60 further include a catalyst temperature sensor 68 for detecting the temperature of the catalytic converter 37, and an air-fuel ratio sensor 69 for detecting the air-fuel ratio from the oxygen concentration of the exhaust gas. Also, the electronic control unit 60 is provided with a start-up switch 70 that is manually operated to start up or stop the control system 61.

The electronic control unit 60 sets the control targets for the fuel injector 40, the air injector 50, the ignition device 54, and the like, on the basis of output signals from the sensors. Then, the electronic control unit 60 outputs control signals set according to the control targets to, for example, the fuel injector 40, the air injector 50, the ignition device 54. For example, the electronic control unit 60 controls the fuel injection amount and fuel injection timing of the fuel injector 40 on the basis of the engine speed and the air intake amount. Also, the electronic control unit 60 controls the timing of the injection of the air-fuel mixture by the ignition device 54 on the basis of the engine speed and the air intake amount.

Figure 6:
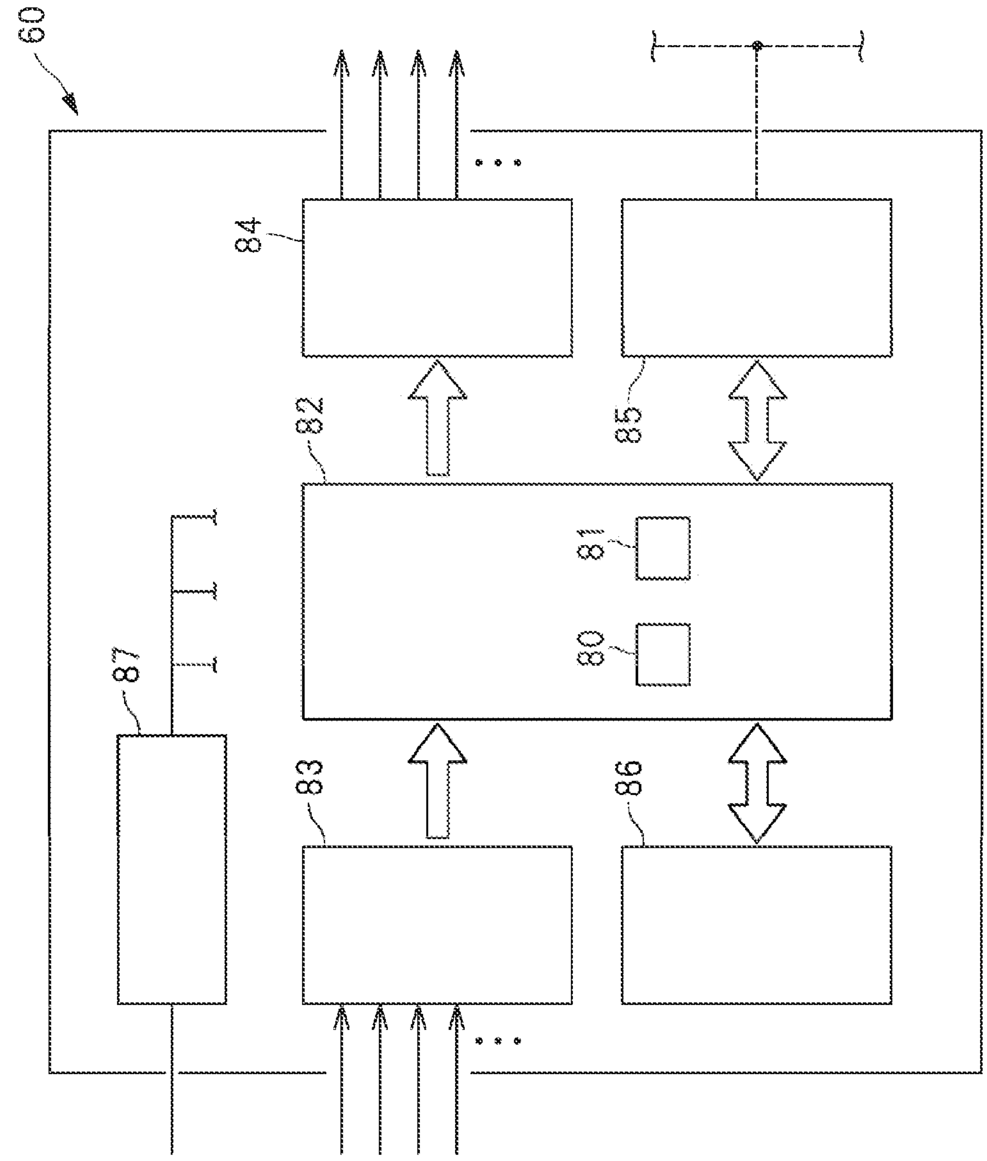
FIG. 6 is a diagram illustrating an example of the basic structure of an electronic control unit.

FIG. 6 is a diagram illustrating an example of the basic structure of the electronic control unit 60. As illustrated in FIG. 6, the electronic control unit 60 forming the control system 61 includes a microcontroller 82 with a built-in processor 80, main memory (memory) 81, and the like. The main memory 81 stores a predetermined program, and the program is executed by the processor 80. The processor 80 and the main memory 81 are communicatively connected to one another. The microcontroller 82 may include a plurality of the built-in processors 80 and a plurality of the built-in main memories 81.

The electronic control unit 60 includes an input circuit 83, a drive circuit 84, a communication circuit 85, an external memory 86, and a power supply circuit 87. The input circuit 83 converts signals input from the various sensors into signals that can be input to the microcontroller 82. The drive circuit 84 generates drive signals for various devices such as the fuel injector 40 described above based on signals output from the microcontroller 82. The communication circuit 85 converts the signals output from the microcontroller 82 into communication signals directed at another electronic control unit. The communication circuit 85 also converts communication signals received from another electronic control unit into signals that can be input to the microcontroller 82. The power supply circuit 87 supplies a stable power supply voltage to the microcontroller 82, the input circuit 83, the drive circuit 84, the communication circuit 85, the external memory 86, and the like. Programs, various types of data, and the like are stored in the external memory 86, which is a non-volatile memory or the like.

At the time of initial engine start, that is, at the time of a cold start, the warm-up operation control of the engine 10 by the control system 61 is executed because the catalytic converter 37 is to be activated by increasing the catalyst temperature at an early stage. In the warm-up operation control, for example, idle-up control for increasing the idling speed past the normal speed, as well as ignition retard control for retarding the ignition timing, is executed. Accordingly, the catalyst temperature can be raised at an early stage and the catalytic converter 37 can be activated at an early stage. The warm-up operation control is continued until a predetermined end condition is satisfied. Examples of the warm-up operation control end condition include the catalyst temperature reaching a specified temperature, the coolant temperature reaching a specified temperature, and the duration of the warm-up operation reaching a specified amount of time.

In the warm-up operation in which warm-up operation control is executed, since the pre-chamber partition wall 43 in the main combustion chamber 32 is also at a low temperature, it is difficult to achieve good combustion of the air-fuel mixture while retarding the ignition timing. That is, when the pre-chamber partition wall 43 is at a low temperature, the fuel injected into the main combustion chamber 32 may adhere to the pre-chamber partition wall 43, locally increasing fuel density. This may cause an increase in hydrocarbons HC, the particle number PN, and the like in the exhaust gas. Accordingly, there is demand for a technique for appropriately executing warm-up operation control of the engine 10 by achieving good combustion of an air-fuel mixture even during the warm-up operation.

Figure 7:
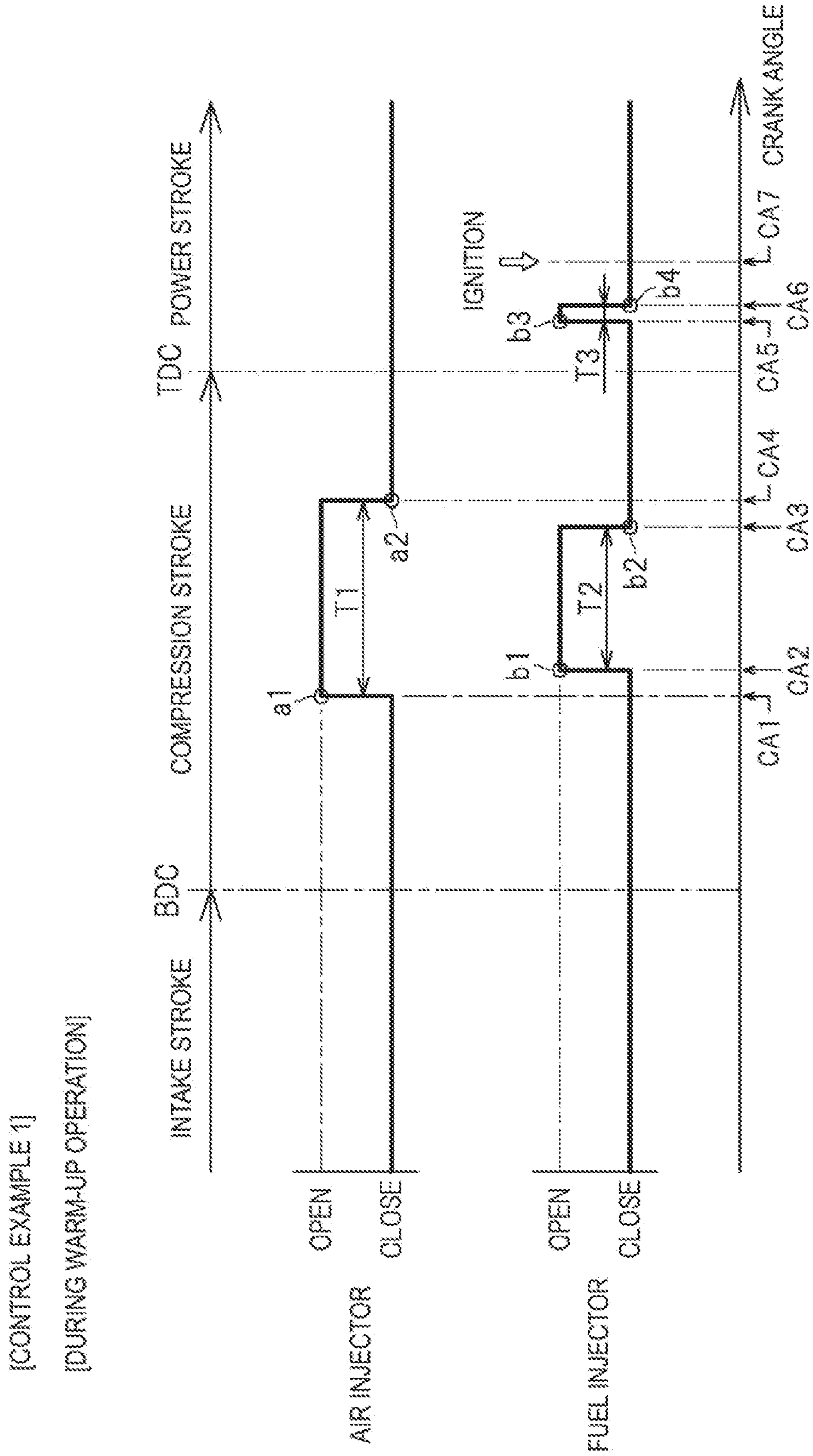
FIG. 7 is a timing chart illustrating an example of an execution state of the combustion control according to control example 1.
Figure 8:
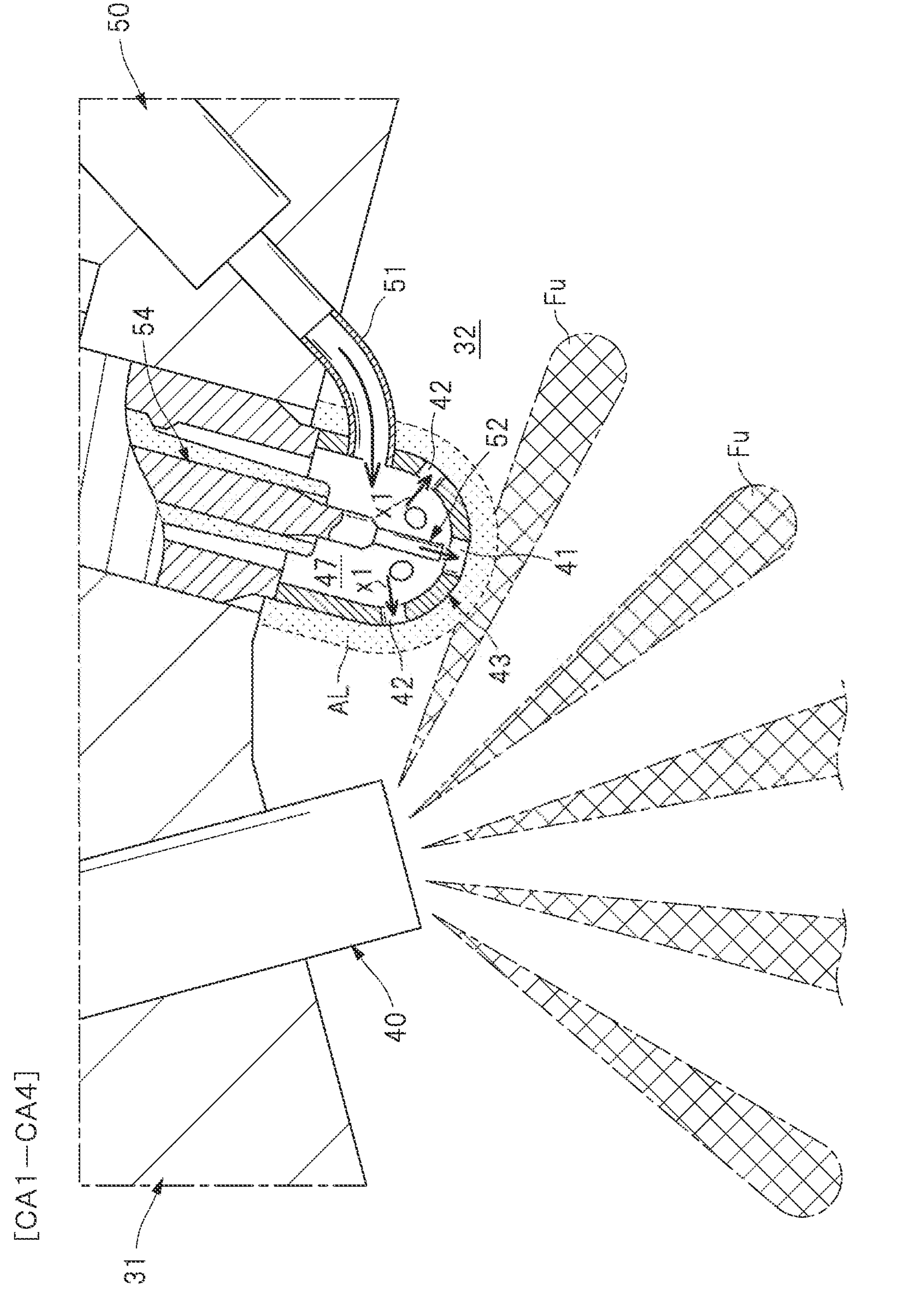
FIG. 8 is a diagram illustrating an operation state of an air injector and a fuel injector at crank angles CA1 to CA4 illustrated in FIG. 7.
Figure 9:
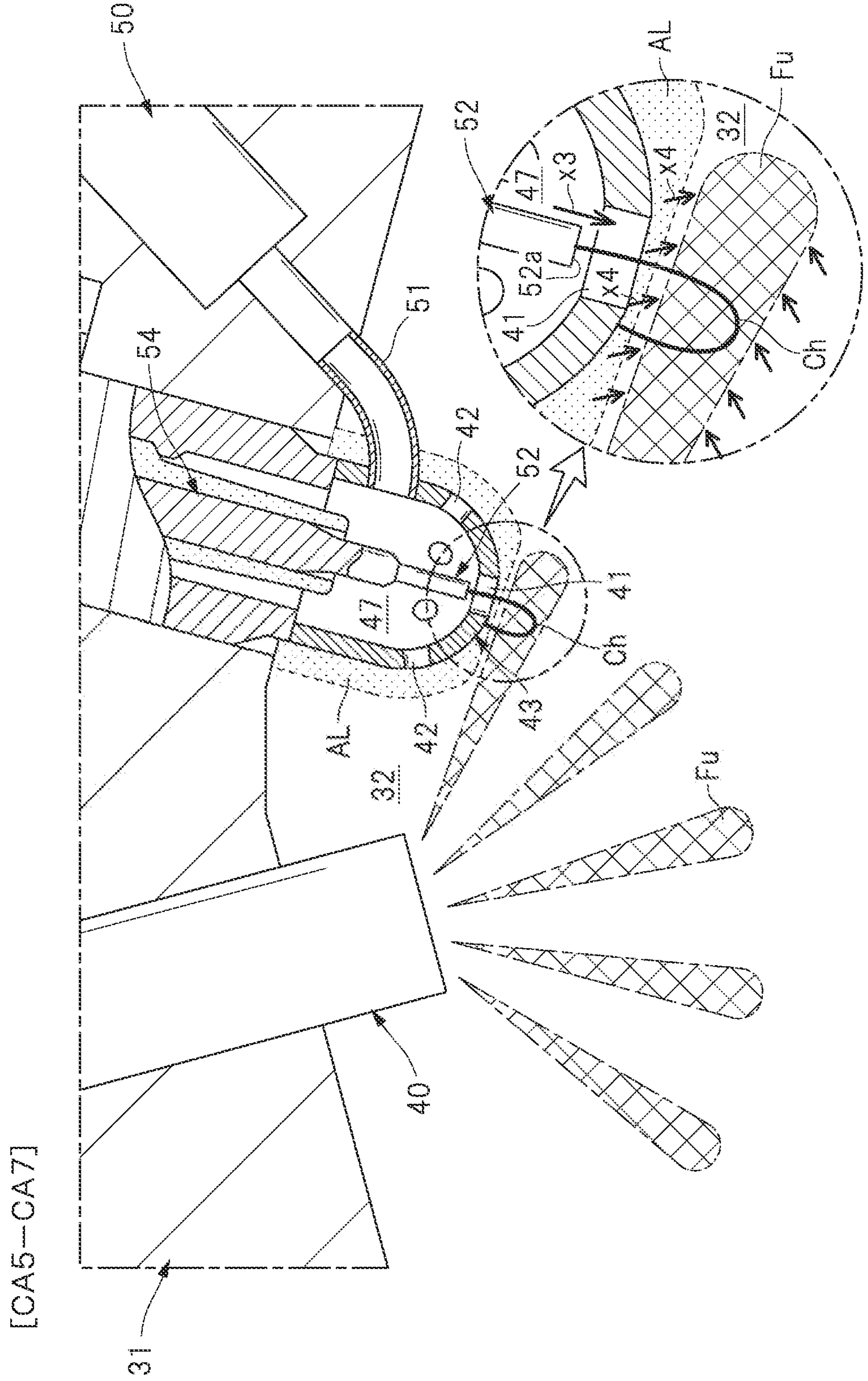
FIG. 9 is a diagram illustrating an operation state of the fuel injector and an ignition device at crank angles CA5 to CA7 illustrated in FIG. 7.

The control system 61 executes combustion control for controlling the air injector 50, the fuel injector 40, and the ignition device 54 during the warm-up operation in which warm-up operation control is executed. FIG. 7 is a timing chart illustrating an example of an execution state of the combustion control according to control example 1. FIG. 8 is a diagram illustrating an operation state of the air injector 50 and the fuel injector 40 at crank angles CA1 to CA4 illustrated in FIG. 7. FIG. 9 is a diagram illustrating an operation state of the fuel injector 40 and the ignition device 54 at crank angles CA5 to CA7 illustrated in FIG. 7. The word 'OPEN' in FIG. 7 means that nozzles (not illustrated) of the fuel injector 40 and the air injector 50 are open. The word 'CLOSE' in FIG. 7 means that the nozzles of the fuel injector 40 and the air injector 50 are closed.

As illustrated in FIG. 7, at the compression stroke during the warm-up operation, the air injector 50 is opened at the crank angle CA1 (reference sign a1), and the fuel injector 40 is opened at the crank angle CA2 (reference sign Ill). Then, the fuel injector 40 is closed at the crank angle CA3 (reference sign b2), and the air injector 50 is closed at the crank angle CA4 (reference sign a2). That is, at the compression stroke during the warm-up operation, fuel injection from the fuel injector 40 into the main combustion chamber 32 is started after air injection from the air injector 50 into the sub-combustion chamber 47 is started. Then, after fuel injection from the fuel injector 40 into the main combustion chamber 32 is stopped, air injection from the air injector 50 into the sub-combustion chamber 47 is stopped. In this manner, the air injector 50 injects air throughout a first period T1, and the fuel injector 40 injects fuel throughout a second period T2. Further, the entire second period T2, which is the fuel injection period, overlaps the first period T1, which is the air injection period.

As described above, at the compression stroke during the warm-up operation, air is injected from the air injector 50 into the sub-combustion chamber 47 and fuel is injected from the fuel injector 40 into the main combustion chamber 32 from the crank angle CA1 to the crank angle CA4. As illustrated in FIG. 8, the air injected from the air injector 50 into the sub-combustion chamber 47 travels through the through holes 41 and 42 of the pre-chamber partition wall 43, as indicated by arrows x1, and is discharged into the main combustion chamber 32. This air covers the pre-chamber partition wall 43 and forms an air layer AL. As illustrated in FIG. 5, the center line CL2 of each side through hole 42 is inclined with respect to the radial direction Dr1 of the ignition electrode 52. Accordingly, as indicated by arrows x2, the air discharged from the side through holes 42 can be swirled, and an appropriate air layer AL covering the pre-chamber partition wall 43 can be formed. By covering the pre-chamber partition wall 43 with the air layer AL in this manner, when fuel Fu is injected at or near the pre-chamber partition wall 43, adhesion of the fuel to the pre-chamber partition wall 43 can be suppressed. The orientation of an injection hole (not illustrated) of the fuel injector 40 is set so that a part of the injected fuel travels in the vicinity of the pre-chamber partition wall 43. That is, the orientation of the injection hole (not illustrated) of the fuel injector 40 is set so that none of the injected fuel impacts the pre-chamber partition wall 43.

As described above, when the pre-chamber partition wall 43 is covered with the air layer AL, adhesion of the fuel to the pre-chamber partition wall 43 can be suppressed. Also, an excessive increase in fuel concentration in the vicinity of the pre-chamber partition wall 43 can be suppressed. Accordingly, the air-fuel mixture can be appropriately combusted at a subsequent ignition timing, and the hydrocarbons HC, the particle number PN, and the like in the exhaust gas can be reduced. However, since air is supplied to the sub-combustion chamber 47 from the air injector 50, it is difficult to ignite the lean air-fuel mixture in the sub-combustion chamber 47 with the ignition electrode 52.

To deal with this, the control system 61 injects a small amount of fuel into the main combustion chamber 32 at the power stroke after top dead center to ignite and appropriately combust the air-fuel mixture. That is, as illustrated in FIG. 7, at the power stroke during the warm-up operation, the fuel injector 40 is opened at the crank angle CA5 (reference sign b3), and the fuel injector 40 is closed at the crank angle CA6 (reference sign b4). Thus, at the power stroke, a small amount of fuel is injected from the fuel injector 40 into the main combustion chamber 32 throughout a third period T3, which is shorter than the second period T2. At the crank angle CA7 after fuel injection, a high voltage is applied to the ignition electrode 52 in the sub-combustion chamber 47.

As illustrated in the enlarged portion of FIG. 9, at the crank angle CA7 after top dead center, the piston 24 moves in the direction away from the cylinder head 31, causing airflow from the sub-combustion chamber 47 to the main combustion chamber 32 as indicated by an arrow x3. Further, the fuel Fu injected from the fuel injector 40 travels through the area near the distal end of the pre-chamber partition wall 43, mixing with the air layer AL covering the pre-chamber partition wall 43 as indicated by arrows x4. As described above, because of the airflow indicated by the arrows x3 and x4 at or near the pre-chamber partition wall 43, airflow is generated that travels from the sub-combustion chamber 47, through the central through hole 41, and toward the main combustion chamber 32. Further, a discharge channel Ch, which is the path of an electric spark, is drawn out from the central through hole 41 toward the main combustion chamber 32.

In this manner, by drawing out the discharge channel Ch toward the main combustion chamber 32, the rich air-fuel mixture of the main combustion chamber 32 can be ignited instead of the lean air-fuel mixture of the sub-combustion chamber 47. That is, when air is injected from the air injector 50 into the sub-combustion chamber 47 to suppress adhesion of fuel to the pre-chamber partition wall 43, the discharge channel Ch is drawn out toward the main combustion chamber 32, causing the air-fuel mixture to be ignited and appropriately combust. In this manner, the air-fuel mixture can be appropriately combusted at the time of the warm-up operation. Thus, the hydrocarbons HC, the particle number PN, and the like in the exhaust gas can be reduced, and the warm-up operation of the engine 10 can be appropriately executed.

The fuel injector 40 and the pre-chamber partition wall 43 are disposed closer to the center CL1 of the main combustion chamber 32 than the intake valve 34 and the exhaust valve 36. Accordingly, the fuel injector 40 and the pre-chamber partition wall 43 can be brought close together. Because of this, as illustrated in FIG. 9, when a small amount of fuel is injected from the fuel injector 40, the fuel can be appropriately supplied to the area in the vicinity of the distal end of the pre-chamber partition wall 43.

Figure 10:
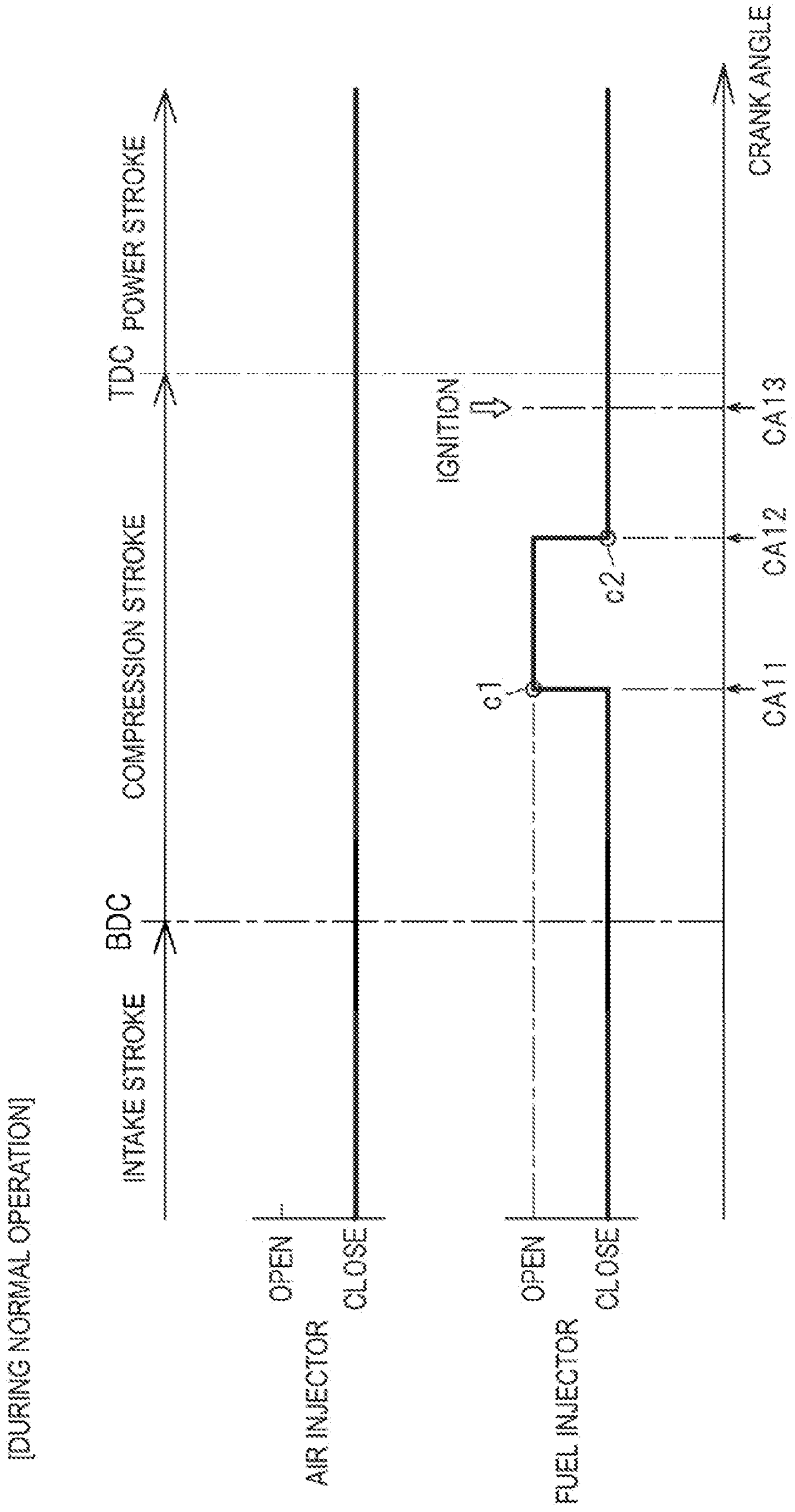
FIG. 10 is a timing chart illustrating an example of an execution state of combustion control during normal operation.
Figure 11:
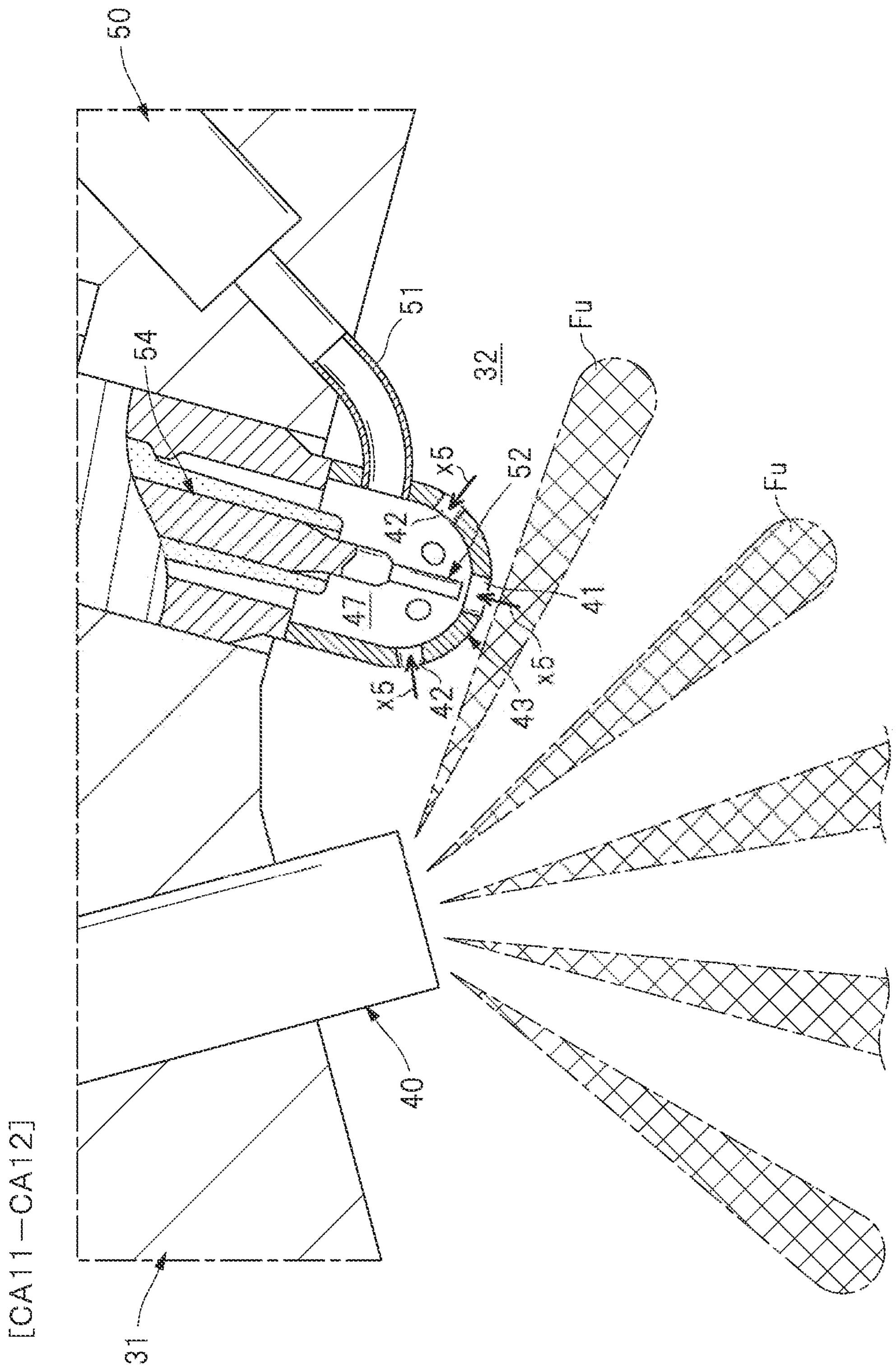
FIG. 11 is a diagram illustrating an operation state of the fuel injector at crank angles CA11 to CA12 illustrated in FIG. 10.
Figure 12:
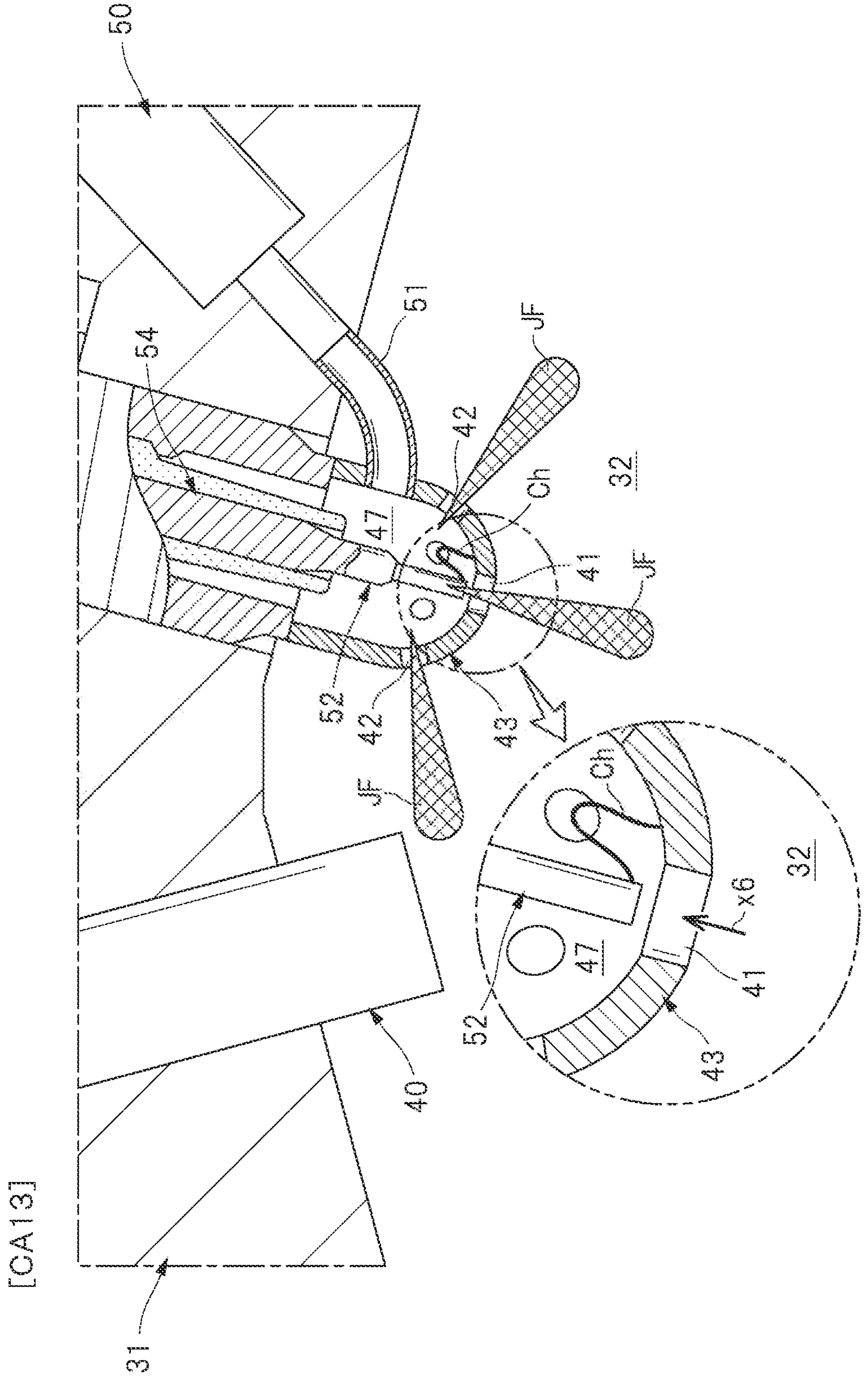
FIG. 12 is a diagram illustrating an operation state of the ignition device at a crank angle CA13 illustrated in FIG. 10.

Next, combustion control during normal operation after the end of the warm-up operation will be described. FIG. 10 is a timing chart illustrating an example of an execution state of the combustion control during normal operation. FIG. 11 is a diagram illustrating an operation state of the fuel injector 40 at crank angles CA11 to CA12 illustrated in FIG. 10. FIG. 12 is a diagram illustrating an operation state of the ignition device 54 at crank angle C13 illustrated in FIG. 10.

As described above, for example, when the temperature of the catalytic converter 37 reaches a specified temperature, the warm-up operation control is ended and the control transitions to normal operation control. At the compression stroke during the normal operation in which normal operation control is executed, as illustrated in FIG. 10, the fuel injector 40 is opened at the crank angle CA11 (reference sign c1), and the fuel injector 40 is closed at the crank angle CA12 (reference sign c2). In this manner, at the compression stroke during the normal operation, the fuel Fu is injected from the fuel injector 40 into the main combustion chamber 32 from the crank angle CA11 to the crank angle CA12, as illustrated in FIG. 11. Also, at the crank angles CA11 to CA12 before top dead center, the piston 24 moves in the direction toward the cylinder head 31, causing airflow from the main combustion chamber 32 to the sub-combustion chamber 47 as indicated by arrows x5.

Accordingly, the air-fuel mixture of the main combustion chamber 32 is supplied to the sub-combustion chamber 47, and the sub-combustion chamber 47 is filled with the air-fuel mixture. Note that during normal operation, the air injector 50 is kept in an inactive state of no air injection.

As illustrated in FIG. 10, at the compression stroke during normal operation, at the crank angle CA13 after fuel injection, a high voltage is applied to the ignition electrode 52 in the sub-combustion chamber 47. As illustrated in the enlarged portion in FIG. 12, at the crank angle CA13 before top dead center, the piston 24 moves in the direction toward the cylinder head 31, causing airflow from the main combustion chamber 32, through the central through hole 41, and to the sub-combustion chamber 47 as indicated by an arrow x6. Accordingly, the discharge channel Ch of the electric spark is drawn in from the central through hole 41 toward the sub-combustion chamber 47, and the air-fuel mixture in the sub-combustion chamber 47 can be ignited. When the air-fuel mixture in the sub-combustion chamber 47 is ignited and combusted in this manner, jets of flames JF are injected from the through holes 41 and 42 of the pre-chamber partition wall 43. That is, since the high-energy jets of flames JF are injected from the sub-combustion chamber 47 into the main combustion chamber 32, the air-fuel mixture in the main combustion chamber 32 can be made lean while maintaining the combustion stability of the air-fuel mixture.

Figure 13:
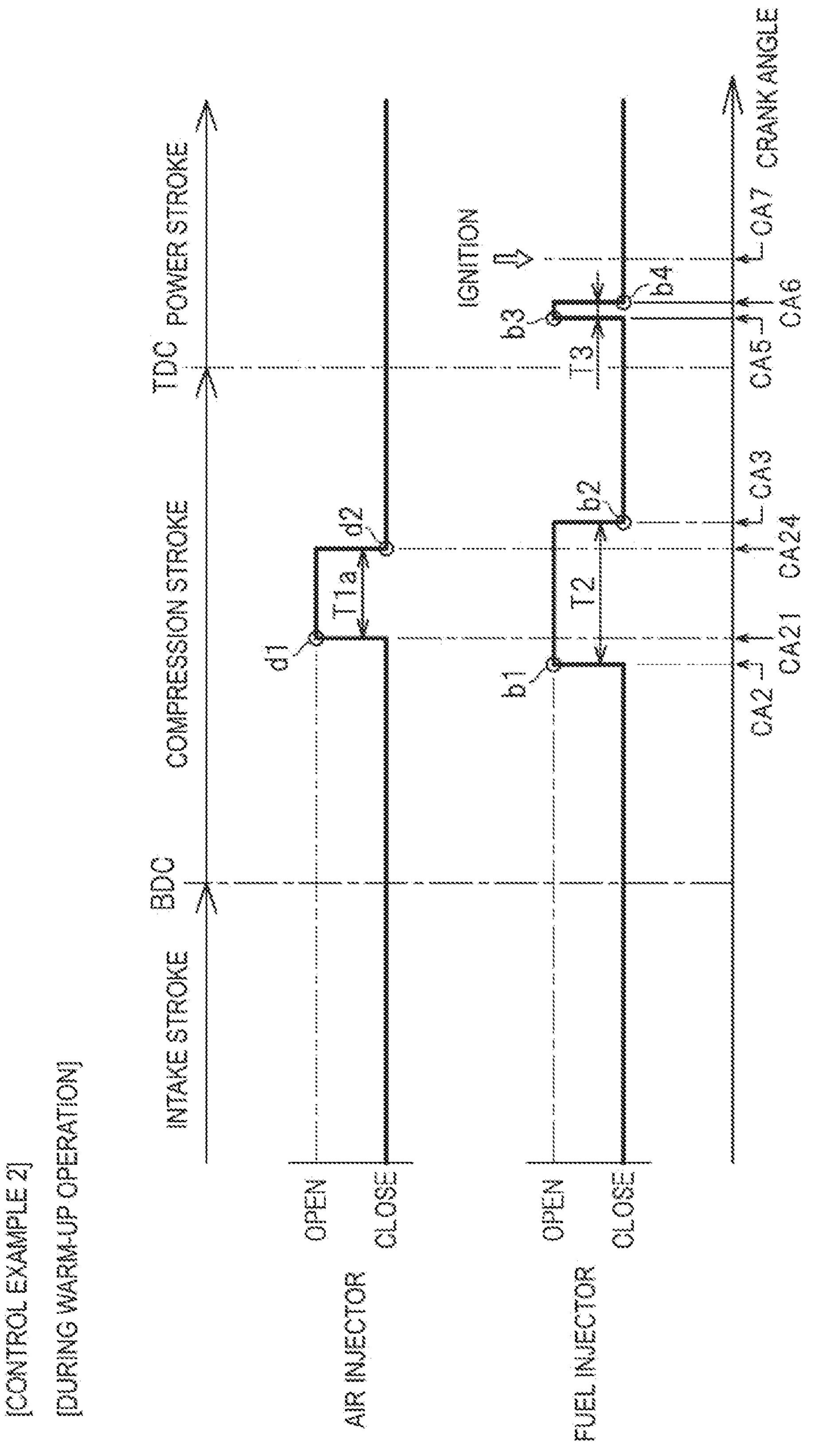
FIG. 13 is a timing chart illustrating another example of an execution state of the combustion control according to control example 2.

In control example 1 illustrated in FIG. 7, all of the second period T2, which is a fuel injection period, overlaps the first period T1, which is an air injection period. However, no such limitation is intended, and it is sufficient that the first period T1 and the second period T2 at least partially overlap. FIG. 13 is a timing chart illustrating another example of an execution state of the combustion control according to control example 2. Note that crank angles and operation states illustrated in FIG. 13 that are similar to the crank angles and operation states illustrated in FIG. 7 are given the same reference signs and descriptions thereof are omitted.

As illustrated in FIG. 13, at the compression stroke during the warm-up operation, the fuel injector 40 is opened at the crank angle CA2 (reference sign b1), and the air injector 50 is opened at a crank angle CA21 (reference sign d1). Then, the air injector 50 is closed at a crank angle CA24 (reference sign d2), and the fuel injector 40 is closed at the crank angle CA3 (reference sign b2). That is, at the compression stroke during the warm-up operation, after fuel injection from the fuel injector 40 into the main combustion chamber 32 is started, air injection from the air injector 50 into the sub-combustion chamber 47 is started. Then, fuel injection from the fuel injector 40 into the main combustion chamber 32 is stopped after air injection from the air injector 50 into the sub-combustion chamber 47 is stopped.

In this manner, fuel is injected from the fuel injector 40 into the main combustion chamber 32 throughout the second period T2, and air is injected from the air injector 50 into the sub-combustion chamber 47 throughout a first period T1*a*, which is shorter than the second period T2. In this manner, when air is injected in the first period T1*a*, which is shorter than the second period T2, the pre-chamber partition wall 43 can be covered by the air layer AL. Accordingly, adhesion of the fuel to the pre-chamber partition wall 43 can be suppressed as in control example 1. Thus, an excessive increase in fuel concentration in the vicinity of the pre-chamber partition wall 43 can be suppressed, and the air-fuel mixture can be appropriately combusted upon ignition.

Note that in the example illustrated in FIG. 13, after fuel injection from the fuel injector 40 into the main combustion chamber 32 is started, air injection from the air injector 50 into the sub-combustion chamber 47 is started. However, no such limitation is intended. Fuel injection from the fuel injector 40 into the main combustion chamber 32 may be started after air injection from the air injector 50 into the sub-combustion chamber 47 is started. Further, in the example illustrated in FIG. 13, after air injection from the air injector 50 into the sub-combustion chamber 47 is stopped, fuel injection from the fuel injector 40 into the main combustion chamber 32 is stopped. However, no such limitation is intended. Air injection from the air injector 50 into the sub-combustion chamber 47 may be stopped after fuel injection from the fuel injector 40 into the main combustion chamber 32 is stopped.

Figure 14:
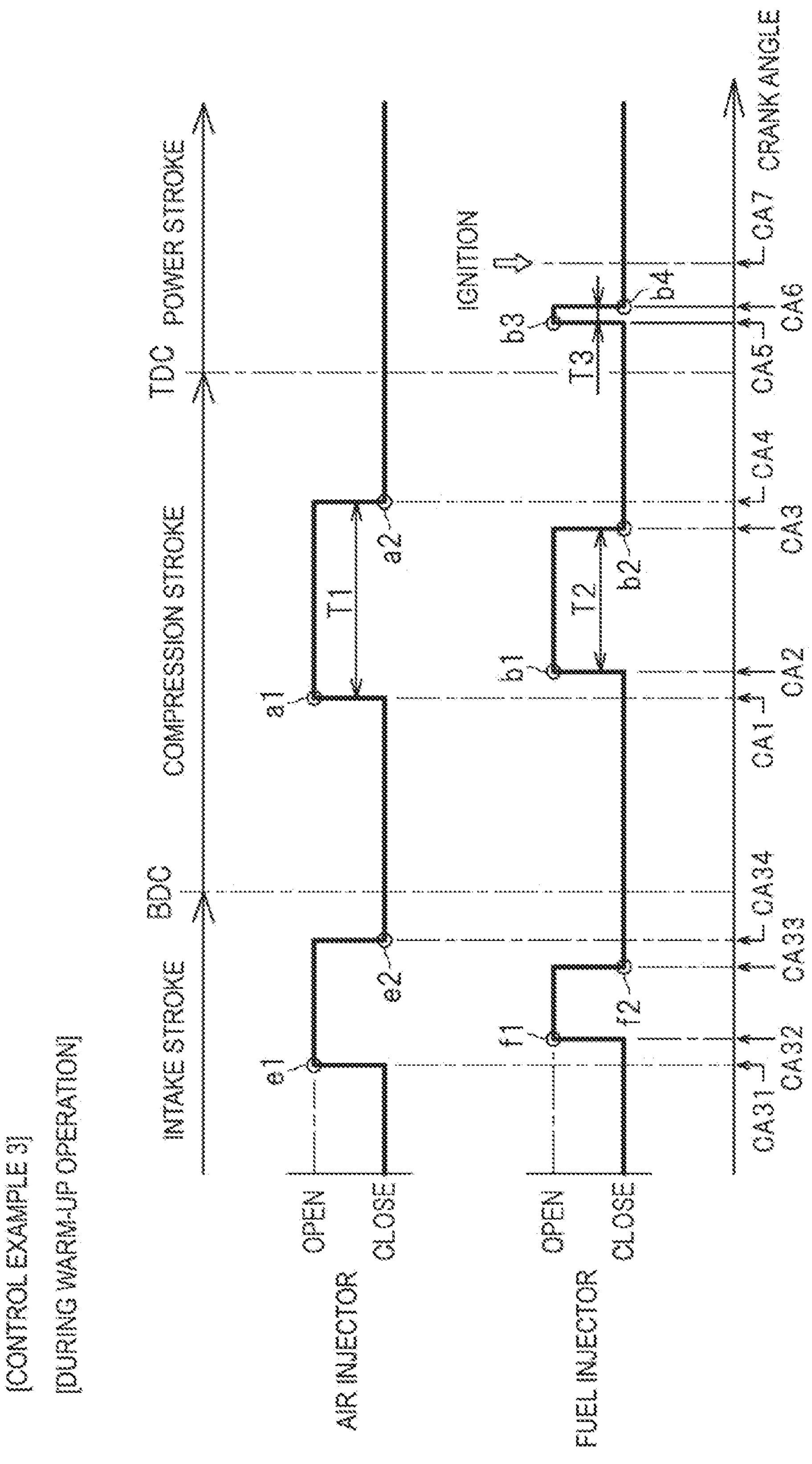
FIG. 14 is a timing chart illustrating an example of an execution state of the combustion control according to control example 3.

In control example 1 illustrated in FIG. 7, at the intake stroke during the warm-up operation, fuel and air are not injected. However, no such limitation is intended. That is, during the warm-up operation, fuel may be injected from the fuel injector 40 and air may be injected from the air injector 50 at the compression stroke as well as the intake stroke. FIG. 14 is a timing chart illustrating another example of an execution state of the combustion control according to control example 3. Note that crank angles and operation states illustrated in FIG. 14 that are similar to the crank angles and operation states illustrated in FIG. 7 are given the same reference signs and descriptions thereof are omitted.

As illustrated in FIG. 14, at the intake stroke during the warm-up operation, the air injector 50 is opened at a crank angle CA31 (reference sign e1), and the fuel injector 40 is opened at a crank angle CA32 (reference sign f1). Then, the fuel injector 40 is closed at a crank angle CA33 (reference sign f2), and the air injector 50 is closed at a crank angle CA34 (reference sign e2). That is, at the intake stroke during the warm-up operation, fuel injection from the fuel injector 40 into the main combustion chamber 32 is started after air injection from the air injector 50 into the sub-combustion chamber 47 is started. Then, after fuel injection from the fuel injector 40 into the main combustion chamber 32 is stopped, air injection from the air injector 50 into the sub-combustion chamber 47 is stopped.

In this manner, when fuel and air are injected from both of the injectors 40 and 50, the pre-chamber partition wall 43 can be covered by the air layer AL at the compression stroke as well as the intake stroke during the warm-up operation. Accordingly, adhesion of the fuel to the pre-chamber partition wall 43 can be suppressed. Thus, an excessive increase in fuel concentration near the pre-chamber partition wall 43 can be suppressed, and the air-fuel mixture can be appropriately combusted upon ignition. Note that at the intake stroke during the warm-up operation, fuel injection from the fuel injector 40 may be started after air injection from the air injector 50 is started. Also, at the intake stroke during the warm-up operation, fuel injection from the fuel injector 40 may be stopped after air injection from the air injector 50 is stopped.

Note that in the example illustrated in FIG. 14, at the intake stroke during the warm-up operation, fuel and air are injected from both of the injectors 40 and 50. However, no such limitation is intended. For example, at the intake stroke during the warm-up operation, fuel may be injected from the fuel injector 40, and air injection from the air injector 50 may be stopped. Also, at the intake stroke during the warm-up operation, air may be injected from the air injector 50, and fuel injection from the fuel injector 40 may be stopped. In these cases, air is injected from the air injector 50 at the compression stroke during the warm-up operation. As a result, the pre-chamber partition wall 43 can be covered by the air layer AL, and adhesion of the fuel to the pre-chamber partition wall 43 can be suppressed.

The present disclosure is not limited by the embodiments described above and includes various modifications within the scope of the present disclosure. For example, in the above description, the control system 61 is implemented by one electronic control unit 60. However, no such limitation is intended, and the control system 61 may be implemented by a plurality of electronic control units 60. Also, the illustrated pre-chamber partition wall 43 includes the hemispherical dome portion 46. However, no such limitation is intended, and a pre-chamber partition wall with a distal end portion of a different shape may be provided. Further, the illustrated engine 10 is an engine that uses gasoline for fuel. However, no such limitation is intended, and the present disclosure may be applied to an engine that uses a fuel other than gasoline. The illustrated engine 10 is an engine to be used in the vehicle 11. However, no such limitation is intended, and the present disclosure may be applied to an engine to be is used as a power source in another apparatus or the like.

According to an aspect of the disclosure, at a compression stroke during a warm-up operation, a control system can cause fuel to be injected from a fuel injector throughout a first period and cause air to be injected from an air injector throughout a second period that at least partially overlaps the first period. Accordingly, good combustion of an air-fuel mixture can be achieved, and the warm-up operation of an engine can be appropriately executed.

The invention claimed is:

1. An engine configured to ignite an air-fuel mixture with an electric spark, the engine comprising:

a cylinder head comprising a chamber partition wall provided with through holes, the chamber partition wall defining a main combustion chamber and a sub-combustion chamber;

a fuel injector provided in the cylinder head, the fuel injector configured to inject fuel into the main combustion chamber;

an air injector provided in the cylinder head, the air injector configured to inject air into the sub-combustion chamber;

an ignition device comprising an ignition electrode disposed in the sub-combustion chamber, the ignition device being configured to cause an electric discharge between the ignition electrode and the chamber partition wall; and a control system comprising a processor and a memory communicatively connected to each other, the control system being configured to control the fuel injector, the air injector, and the ignition device, wherein the control system is configured to at a compression stroke during a warm-up operation, cause the fuel to be injected from the fuel injector throughout a first period, and cause the air to be injected from the air injector throughout a second period that overlaps at least a part of the first period, and at a power stroke during the warm-up operation, cause the electric discharge between the ignition electrode and the chamber partition wall after causing the fuel to be injected from the fuel injector.

2. The engine according to claim 1, wherein the through holes comprise a first through hole opposing a distal end of the ignition electrode and second through holes opposing a side surface of the ignition electrode.

3. The engine according to claim 2, wherein center lines of the second through holes are inclined with respect to a radial direction of the ignition electrode.

4. The engine according to claim 2, wherein the first through hole is a central through hole.

5. The engine according to claim 4, wherein the second through holes are arranged at predetermined intervals around the first through hole.

6. The engine according to claim 5, wherein the fuel injector is further configured to inject the fuel such that i) the fuel passes through an air layer around the chamber partition wall and ii) the fuel does not impact the chamber partition wall directly, wherein the air layer includes the air injected from the air injector and passing through the first through hole.

7. The engine according to claim 1, wherein the fuel injector and the chamber partition wall are disposed closer to a center of the main combustion chamber than an intake valve and an exhaust valve.

8. The engine according to claim 1, wherein the control system is configured to, at the power stroke during the warm-up operation, cause the electric discharge between the ignition electrode and the chamber partition wall after causing the fuel to be injected from the fuel injector throughout a third period shorter than the first period.

* * * * *